Nov. 9, 1965
W. A. LLOYD
3,216,264
MOTION TRANSLATION DEVICE
Filed July 6, 1962
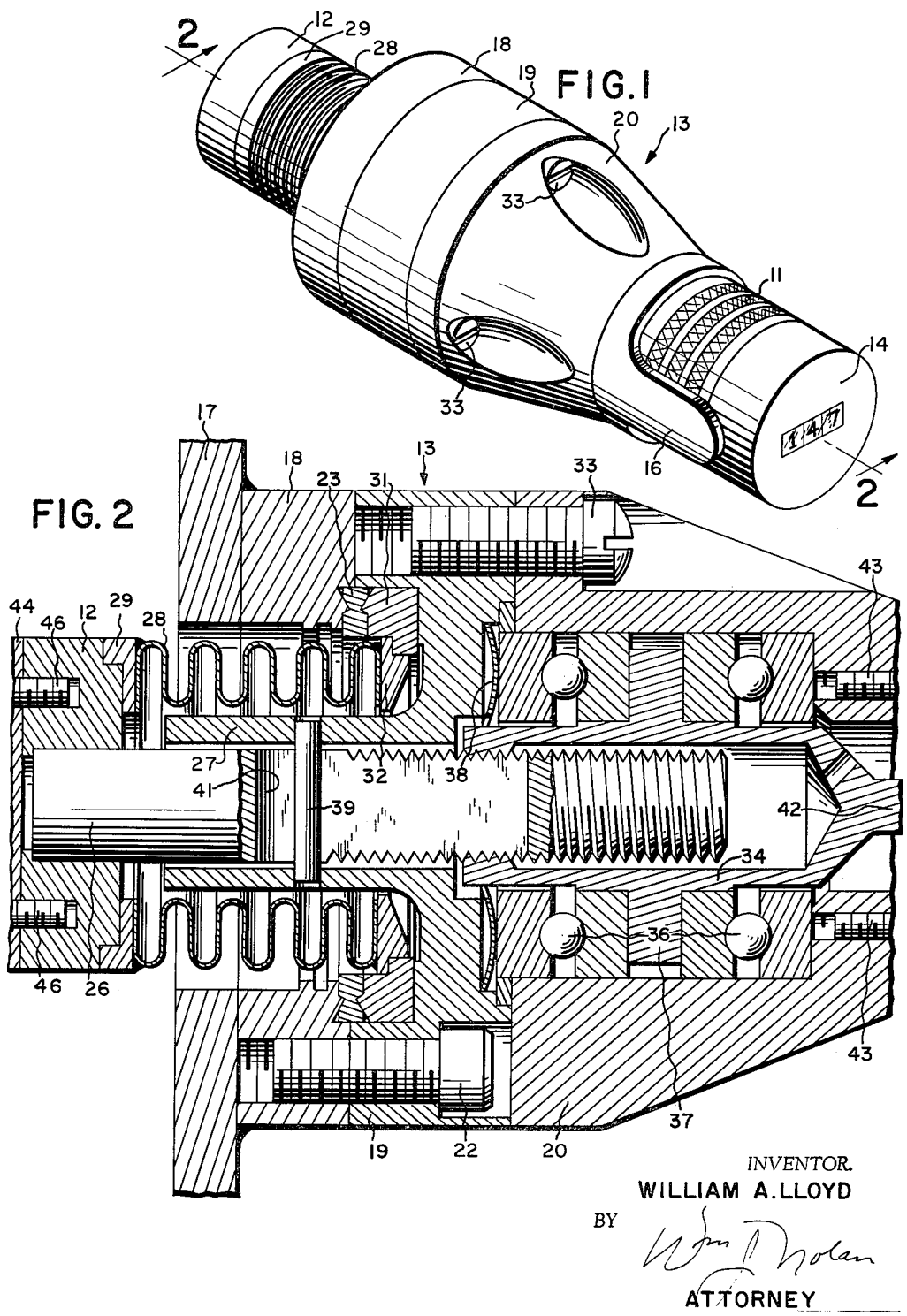
INVENTOR.
WILLIAM A. LLOYD
BY
*Wm P Nolan*
ATTORNEY

3,216,264
MOTION TRANSLATION DEVICE
William Arthur Lloyd, Mountain View, Calif., assignor to Varian Associates, Palo Alto, Calif., a corporation of California
Filed July 6, 1962, Ser. No. 207,938
1 Claim. (Cl. 74—18.2)

This invention relates to a motion translation device and, particularly, to a device for translating precise linear increments, for example through a high vacuum wall.

A motion translation device to be accurate and precise should include precision parts. However, most precision parts, such as bearings and rotating shafts, will warp, corrode, and have their lubricants dried at the relatively high baking temperatures utilized while high vacuum systems are being evacuated. The reason for high temperature baking is that unbaked components in a system are gas sources that prevent the pressure in the system from reaching a predetermined low value.

An object of this invention, therefore, is to provide a bakeable, improved and accurate motion translation device that is usable in high vacuum systems.

A feature of this invention is the provision of a precision lead screw and bearings which can be readily removed from the translation device without destroying the high vacuum in a system so that, as the vacuum system is baked, deterioration of the precision members is prevented.

Another feature of this invention is the provision of a thrust bearing on a lead screw, and a biasing member to eliminate backlash in the axial direction between the cooperating members.

Another feature of this invention is the provision of a keyed driven member whereby rotational backlash is eliminated and the driven member is free to move axially and preferably within predetermined limits whereby a flexible bellows is not overstretched.

Another feature of this invention is the provision of a counter or measuring mechanism in combination with a precision translation device whereby linear displacement increments as small as one thousandth of an inch are read directly and accurately.

Another feature of this invention is the provision of suitable flanges and gaskets on a translation device whereby the device is mountable onto a flange in a vacuum system.

These and other features and advantages of the present invention will be more apparent after a perusal of the following specification taken in connection with the accompanying drawing wherein:

FIG. 1 is a pictorial representation of the translation device, and

FIG. 2 is an axial cross section of the device in FIG. 1.

Referring to the drawing and to FIG. 1 in particular, the translation device has a knurled knob 11 which is preferably operated by hand to cause a pusher plate 12 at the other end to move axially toward or away from the knob 11. Disposed therebetween is a stationary housing 13 which encloses the precision mechanism and flexible vacuum sealing means. A counter 14 is supported on axially extended fingers 16 fixed to the housing 13.

Referring to FIG. 2 a wall and an annular flange of the vacuum vessel are represented by items 17 and 18, respectively, to which is mounted the housing 13. The housing 13 includes two detachable units 19 and 20. Unit 19 is made to withstand high temperatures, as will be described hereinafter, and is secured to flange 18, for example, by bolts 22 arranged in a bolt circle about the axis of the device. A suitable gasket 23, preferably made of metal, for example, copper, to withstand high temperatures, forms the bakeable seal between unit 19 and flange 18.

The pusher plate 12 is mounted at the end of a rod 26 which, in turn, slideably engages a sleeve 27 centrally disposed on unit 19. Since pusher plate 12 should move relative to the vacuum wall 17 and in turn relative to unit 19, a flexible metal bellows 28 is bonded vacuum tight at at one end to plate 12 through the aid of an adapter ring 29. The other end of bellows 28 is bonded vacuum tight to a sealing ring 31 also through the aid of another adapter ring 32. Ring 31 has machined thereon a surface which engages gasket 23 in vacuum tight relationship. Ring 31 could be made integral with unit 19, but since the sealing surface on 31 is a very accurately machined surface, while unit 19 is machined to wider tolerances, two separate pieces were found to be more economical to fabricate. Ring 31 need not be sealed vacuum tight to unit 19 since the contacting surfaces between the two do not form the vacuum wall.

The other unit of the housing 13, unit 20, has substantially a tubular shape and is readily mountable to unit 19 preferably by bolts 33 preferably located between bolts 22 on a circumference. A rotatable shaft 34 is disposed on the axis of the device and is supported by bearings 36. Shaft 34, having internal threads, engages external threads on rod 26 so that as shaft 33 rotates rod 26 moves axially.

In order for rod 26 to move axially, shaft 34 should be restrained in the axial direction. Bearings 36 are primarily thrust bearings and are mounted one on each side of a collar 37 formed on shaft 34 so that one bearing takes the thrust in one direction while the other bearing takes thrust in the opposite direction. Blacklash is prevented or minimized by a spring washer 38. Spring washer 38 also prevents overloading the bearings 36 when bolts 33 are tightened.

Since shaft 34 threads onto rod 26, rod 26 would tend to rotate with the shaft due to the friction between the threads. Friction could be minimized by gold plating rod 26 to prevent oxidation thereof during bakeout. Bellows 28, for maximum effectiveness, should be flexible, and being flexible the bellows does not completely restrain rotation of the rod 26 due to friction. Such rotation of rod 26 is objectionable because pusher plate 12 would have two different axial positions for a given setting of the knob 11. The axial positions would depend on which way the knob 11 was turned to reach the position. Rod 26 is positively restrained from rotating by a pin 39 disposed diagonally within and fixed to the sleeve 27. Rod 26 has an elongated diagonally-directed slot 41 through which pin 39 extends to form a key means which prevents the rod 26 from rotating, but allows the rod 26 to move axially.

The knurled knob 11 engages a stub axle 42 on shaft 34 and has a set screw (not shown) to secure it in place. The fingers 16 holding counter 14 are bolted in place by bolts 43. Counter 14 is preferably of the type that converts revolutions of shaft 34 to inches of travel of the pusher plate 12, and since the translation device precisely moves plate 12 linearly as knob 11 is rotated, the counter being in engaging relationship with knob 11 measures to an accuracy of for example .001 of an inch. An item 44 in the vacuum system to be translated could be bolted to plate 12 by bolts 46.

The translation device 13 is preferably used as follows: The unit 19 and its component parts are bolted to flange 18 forming a vacuum tight seal at gasket 23. As the system is evacuated and baked to a high temperature, most of the gas is out-gassed off the interior walls of the system. When the system is cooled, shaft 34 with one bearing 36, properly lubricated with for example oil, and spring washer 38 assembled thereon is threaded onto rod 26. Then the other bearing 36 is slipped into place and unit 20 is bolted into place. Then the knob 11 and counter 14 are secured in place, and the unit is ready for use.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

A device for precisely translating axial motion into a high vacuum system through an opening in a wall of said system, said device being constructed so that its precision is unaffected by the high temperatures associated with bakeout of the high vacuum system comprising: a body member to be secured in vacuum tight manner over the opening in the wall of said system and having an apertured sleeve portion to extend into said system; a rod member axially movable within said body member having an engageable portion at one end; means secured to said body member for preventing rotational movement of said rod member; flexible seal means connected in vacuum tight manner between said rod member and said body member, said rod member, body member and flexible seal means forming with the wall of said vacuum system a continuous vacuum tight enclosure; a precision drive unit constructed of materials unable to withstand the temperatures occurring during bakeout to be disposed exteriorly of said vacuum tight enclosure, said drive unit comprising: a tubular body member, a shaft having an engaging portion disposed within said tubular body member, the engaging portion of said shaft engaging the engageable portion of said rod member to cause axial motion of said rod member upon rotational movement of said shaft, means disposed within said tubular body member for restraining axial motion of said shaft, said last named means including thrust bearings packed with lubricant, and means coupled to said shaft for indicating the translation of said rod member within the vacuum system; and means for removably securing said unit to said annular body member without affecting the vacuum of the vacuum tight enclosure, whereby said precision unit can be removed during bakeout of said vacuum system without disturbing the vacuum integrity of said system.

References Cited by the Examiner

UNITED STATES PATENTS

| | | | |
|---|---|---|---|
| 1,478,815 | 12/23 | Blauvelt | 74—18.2 X |
| 2,105,864 | 1/38 | Saunders | 74—18.2 X |
| 2,212,572 | 8/40 | McCarthy et al. | 74—424.8 |
| 2,228,849 | 1/41 | Sandos et al. | 74—18.2 |
| 2,240,977 | 5/41 | Bryant et al. | 74—424.8 |
| 3,077,792 | 2/63 | Kinderman | 74—18.2 X |
| 3,100,348 | 8/63 | Egli | 74—424.8 X |

BROUGHTON G. DURHAM, *Primary Examiner.*